US012636761B1

(12) United States Patent
Robillard

(10) Patent No.: US 12,636,761 B1
(45) Date of Patent: May 26, 2026

(54) IMPACT TOOL ANVIL BRAKE MECHANISM

(71) Applicant: Snap-on Incorporated, Kenosha, WI (US)

(72) Inventor: Adrian Robillard, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 19/187,053

(22) Filed: Apr. 23, 2025

(51) Int. Cl.

| | |
|---|---|
| ***B25B 21/02*** | (2006.01) |
| ***B25F 3/00*** | (2006.01) |
| ***B25F 5/00*** | (2006.01) |
| ***B25F 5/02*** | (2006.01) |

(52) U.S. Cl.
CPC .............. *B25B 21/026* (2013.01); *B25F 3/00* (2013.01); *B25F 5/001* (2013.01); *B25F 5/02* (2013.01)

(58) Field of Classification Search
CPC ......... B25B 21/026; B25B 5/001; B25F 3/00; B25F 5/02
See application file for complete search history.

(56) References Cited

U.S. PATENT DOCUMENTS 4,350,213 A 9/1982 Antipov et al.
7,654,779 B2 2/2010 Sasaki et al.
9,050,713 B2 6/2015 Hartmann et al.
9,193,053 B2 11/2015 Rudolph et al.
9,522,461 B2 12/2016 Comori et al.
11,351,663 B2 6/2022 McClung et al.
11,465,264 B2 10/2022 Schneider et al.
11,554,468 B2 1/2023 Duncan et al.
2008/0099217 A1* 5/2008 Seith ..................... B25B 21/026 173/1
2008/0217039 A1 9/2008 Fuenfer et al.
2012/0111592 A1* 5/2012 Limberg ............. B25B 23/1405 173/48
2014/0158388 A1* 6/2014 Johnson .............. B25B 23/0035 173/1
2015/0352699 A1 12/2015 Sakai et al.
2021/0053201 A1* 2/2021 Mandal ................... B25F 5/006
2022/0111502 A1* 4/2022 Abbott ................ B25B 23/1475
2022/0331937 A1 10/2022 Nick et al.
2023/0013436 A1 1/2023 Dai
2023/0390914 A1* 12/2023 Chang ........................ B25F 5/02
2025/0115328 A1* 4/2025 Hahn ......................... B62J 6/01

* cited by examiner

*Primary Examiner* — Michelle Lopez
(74) *Attorney, Agent, or Firm* — Taft, Stettinius & Hollister LLP

(57) ABSTRACT

An anvil brake mechanism of an impact mechanism for an impact tool. In general, the impact mechanism is disposed within a housing of the impact tool and includes a gear carrier, a hammer, an anvil, and an anvil brake mechanism. The anvil brake mechanism may restrict the anvil from rotating backwards or oscillating after the hammer impacts the anvil. This may increase the efficiency of the impact from the hammer to the anvil as well as reduce wear on the anvil.

15 Claims, 8 Drawing Sheets

IMPACT TOOL ANVIL BRAKE MECHANISM

TECHNICAL FIELD

The present application relates generally to impact tools, and more particularly to anvil brake mechanisms for impact tools.

BACKGROUND

Power tools, such as impact wrenches, drivers, or tools, are commonly used to complete industrial, automotive, or home improvement tasks. M any power tools are portable and electrically powered, such as with a rechargeable battery, allowing a user to apply torque or force on a workpiece, such as a fastener, without exerting a substantial amount of energy. Often, fasteners, such as lug nuts of wheels of a vehicle, are corroded or require high torque levels to install or remove. An impact tool eases such installation or removal by repeatedly imparting impacting forces to the fastener.

In general, an impact tool includes an impact mechanism that is designed to deliver high torque output by storing energy in a rotating mass, then delivering it suddenly in a repetitive impacting fashion to an output shaft of the tool. Impact tools generally include a housing that houses the impact mechanism, a motor, and electronic components for controlling the motor. During operation, a rotating mass, known as a hammer, is rotated by a gear carrier coupled to the motor, storing energy, then axially moved into contact with anvil lugs of an anvil, creating a sudden rotational impacting force. The impact mechanism is designed so that after delivering the impact, the hammer is again allowed to spin freely from the anvil to repeat the process, as needed.

During initial use of an impact tool on a workpiece and/or when the fit between the workpiece and a tool is loose, the anvil may oscillate backwards after the hammer impacts the anvil. When the anvil travels backwards relative to the hammer, speed of the tool and therefore force applied to the workpiece may be lost. This may lead to lower force applied to the workpiece because the rotational travel allowed for the hammer during the next or subsequent impact is reduced. This may also cause the subsequent impact to occur with low overlap of the hammer and anvil lugs, causing increased wear and tear, resulting in premature tool failure.

SUMMARY

The present invention relates broadly to an anvil brake mechanism of an impact mechanism for an impact tool, such as an impact driver, wrench, drill, or other type of impact tool. In general, the impact mechanism is disposed within a housing of the impact tool and includes a gear carrier operably coupled to a motor, a hammer operably coupled to the gear carrier, an anvil with an anvil aperture that is adapted to receive an engagement member of the gear carrier, and an output shaft and drive lug, and an anvil brake mechanism operably coupled to the anvil. The motor may rotate the gear carrier, which causes rotation of the hammer, and thereby rotation of the anvil. Once an amount of torque required to rotate or drive the output drive lug exceeds a minimum torque amount, the gear carrier rotates at a faster rotational velocity compared to the hammer and the anvil, thereby causing the hammer to move in an axial direction away from the anvil until the hammer no longer contacts the anvil. Then, the hammer is moved axially towards the anvil and delivers an abrupt rotational impact force to the anvil and, consequently, the output drive lug. The anvil brake mechanism may restrict the anvil from rotating backwards or oscillating after the hammer impacts the anvil. This may increase the efficiency of the impact from the hammer to the anvil as well as reduce wear on the anvil.

In an embodiment, the anvil brake mechanism includes an O-ring disposed within the anvil aperture and around the engagement member. The O-ring is adapted to frictionally engage the anvil and the engagement member to restrict the anvil from rotating backwards or oscillating after the hammer impacts the anvil.

In another embodiment, the anvil brake mechanism includes a thrust washer (also known as a thrust bearing) and a biasing washer (such as, for example, a Belville washer). The thrust washer is circumferentially disposed around the engagement member between a main body of the gear carrier and an end surface of the anvil, and the biasing washer is circumferentially disposed around the engagement member between the thrust washer and the end surface of the anvil. The biasing washer is adapted to provide a variable load between the anvil and gear carrier, which allows for a preload to be applied to the anvil to restrict the anvil from rotating backwards or oscillating after the hammer impacts the anvil.

In another embodiment, the anvil brake mechanism includes a clutching mechanism, such as a one-way bearing or sprag clutch. The clutching mechanism is operably coupled to the output shaft of the anvil and is adapted to engage an outer surface of the output shaft to restrict the anvil from rotating backwards or oscillating after the hammer impacts the anvil.

In an embodiment, the present invention relates to an impact mechanism for an impact tool. The impact mechanism includes a hammer including a hammer lug, a gear carrier including opposing first and second end portions, and an anvil including an anvil aperture, an inner surface formed by the anvil aperture, and an impact section that is adapted to receive a rotational impact force from the hammer lug. The first end portion of the gear carrier is adapted to be rotatably driven by a motor, and the second end portion is adapted to be disposed in the anvil aperture. An O-ring is adapted to be disposed in the anvil aperture and around the second end portion, wherein the O-ring is adapted to frictionally engage the inner surface to restrict the anvil from rotating backwards when the impact section receives the rotational impact force from the hammer lug.

In another embodiment, the present invention relates to an impact mechanism for an impact tool. The impact mechanism includes a hammer including a hammer lug, a gear carrier including opposing first and second end portions, and an anvil including an anvil end surface, an anvil aperture extending into the anvil end surface, and an impact section adapted to receive a rotational impact force from the hammer lug. The first end portion of the gear carrier is adapted to be rotatably driven by a motor, and the second end portion is adapted to be disposed in the anvil aperture. A thrust washer is adapted to be disposed around the second end portion between the anvil end surface and the body portion, and a biasing washer is adapted to be disposed around the second end portion between the thrust washer and the anvil end surface. The biasing washer is adapted to engage the anvil end surface to restrict the anvil from rotating backwards when the impact section receives the rotational impact force from the hammer lug.

In another embodiment, the present invention relates to an impact mechanism for an impact tool. The impact mechanism includes a hammer having a hammer lug, an anvil having an output shaft and an impact section that is adapted to receive a rotational impact force from the hammer lug, a gear carrier that is adapted to be rotatably driven by a motor and operably coupled to the anvil, and a clutch disposed on the output shaft of the anvil and adapted to engage the anvil to restrict the anvil from rotating backwards when the impact section receives the rotational impact force from the hammer lug.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
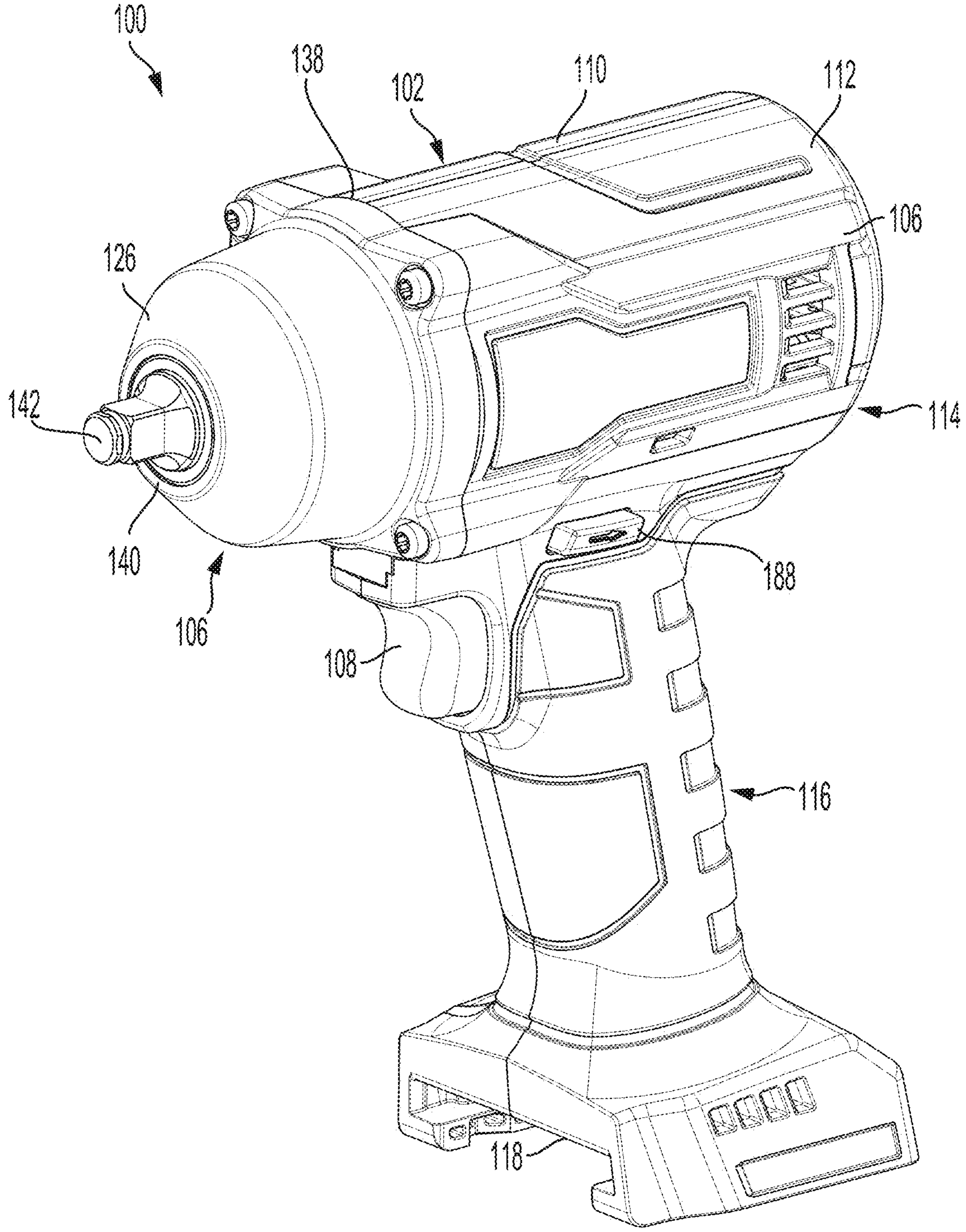
FIG. 1 is a perspective view of an exemplar impact tool, incorporating an embodiment of the present invention.
Figure 2:
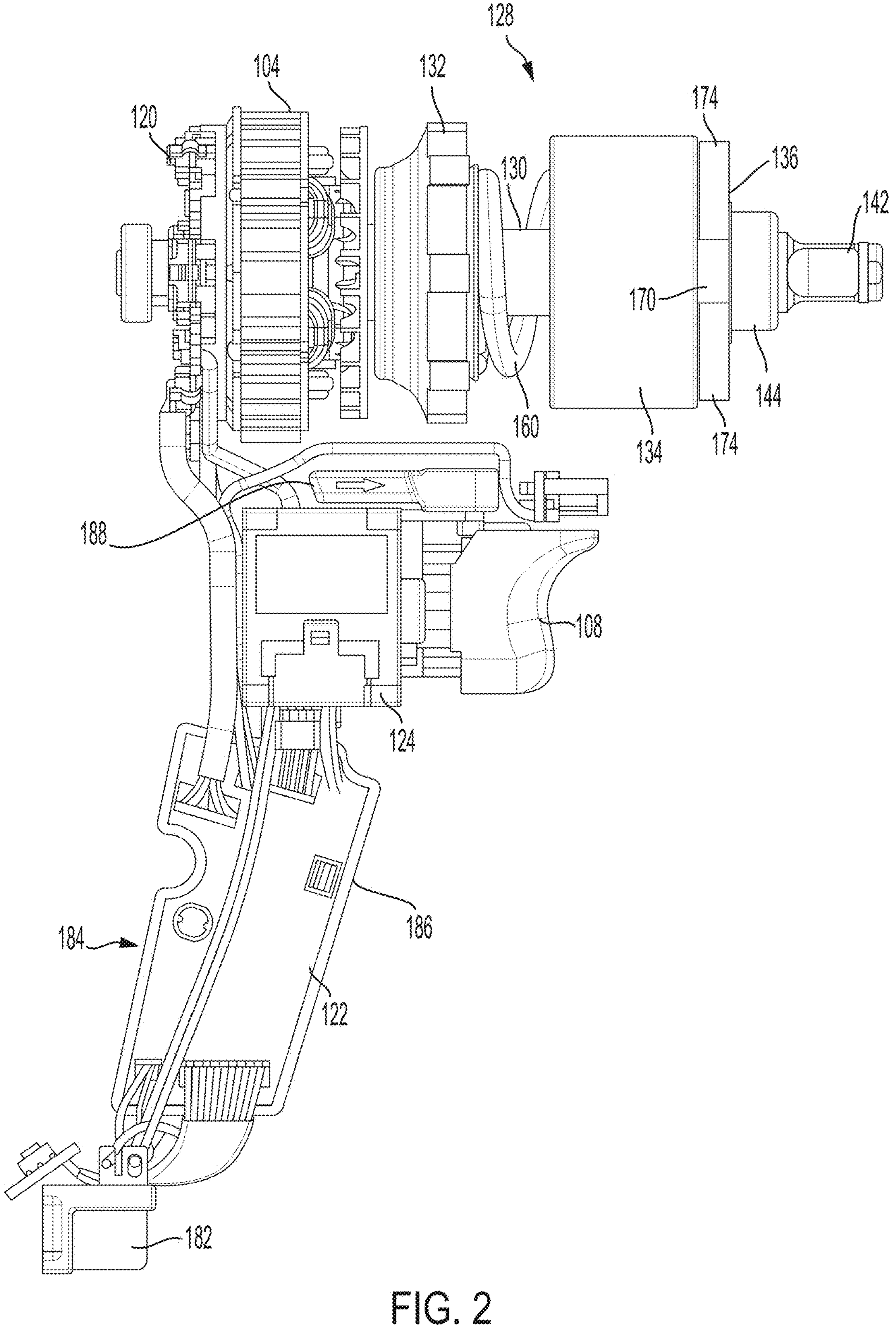
FIG. 2 is a side view of internal components of an exemplar impact tool, incorporating an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to an anvil brake mechanism of an impact mechanism for an impact tool, such as an impact driver, wrench, drill, or other type of impact tool. In general, the impact mechanism is disposed within a housing of the impact tool and includes a gear carrier operably coupled to a motor, a hammer operably coupled to the gear carrier, an anvil with an anvil aperture that is adapted to receive an engagement member of the gear carrier, and an output shaft and drive lug, and an anvil brake mechanism operably coupled to the anvil. The motor may rotate the gear carrier, which causes rotation of the hammer, and thereby rotation of the anvil. Once an amount of torque required to rotate or drive the output drive lug exceeds a minimum torque amount, the gear carrier rotates at a faster rotational velocity compared to the hammer and the anvil, thereby causing the hammer to move in an axial direction away from the anvil until the hammer no longer contacts the anvil. Then, the hammer is moved axially towards the anvil and delivers a rotational impact force to the anvil and, consequently, the output drive lug that operably engages an output tool, such as a socket, which is engaged with a work piece, such as a fastener. The anvil brake mechanism restricts the anvil from rotating backwards or oscillating after the hammer impacts the anvil. This increases the efficiency of the impact from the hammer to the anvil as well as reduces wear on the anvil.

In an embodiment, the anvil brake mechanism includes an O-ring disposed within the anvil aperture and around the engagement member. The O-ring is adapted to frictionally engage the anvil and the engagement member to restrict the anvil from rotating backwards or oscillating after the hammer impacts the anvil.

In another embodiment, the anvil brake mechanism includes a thrust washer (also known as a thrust bearing) and a biasing washer (such as, a Belville washer). The thrust washer is disposed around the engagement member between a main body of the gear carrier and an end surface of the anvil, and the biasing washer is disposed around the engagement member between the thrust washer and the end surface of the anvil. The biasing washer is adapted to provide a variable load between the anvil and gear carrier, which allows for a preload to be applied to the anvil to restrict the anvil from rotating backwards or oscillating after the hammer impacts the anvil.

In another embodiment, the anvil brake mechanism includes a clutching mechanism, such as a one-way bearing or sprag clutch. The clutching mechanism is operably coupled to the output shaft of the anvil and is adapted to engage an outer surface of the output shaft to restrict the anvil from rotating backwards or oscillating after the hammer impacts the anvil.

Referring to FIGS. 1-4, an exemplar impact tool 100, such as, for example, an impact wrench or driver, is shown and described. The impact tool 100 includes a tool housing 102, a motor 104 disposed in the tool housing 102, an output nose mechanism 106 coupled to the tool housing 102 at a front or working end of the impact tool 100 and operably coupled to the motor 104, and an actuatable trigger 108 adapted to operate the motor 104 and thereby the output nose mechanism 106.

In an embodiment, the tool housing 102 is a clamshell-type housing having first and second housing portions 110, 112 (respectively forming first and second sides of the tool housing 102) that are coupled together via fasteners to cooperatively form the tool housing 102. In another embodiment, the tool housing 102 (including the first and second housing portions 110, 112) may be a single integrated or monolithic piece. The tool housing 102 includes a motor housing portion 114 and a handle housing portion 116. The handle housing portion 116 may extend from the motor housing portion 114 to a power source receiving end 118 that is adapted to receive and couple to a power source, such as, for example, a removable battery pack, for providing power to the impact tool 100. In an embodiment, the motor housing portion 114 and handle housing portion 116 may be disposed at an angle relative to each other, thus forming a pistol-grip type tool. For example, in an embodiment, a longitudinal axis of the motor housing portion 114 and a longitudinal axis of the handle housing portion 116 may be disposed at an angle of about 90 to about 120 degrees, and preferably about 110 degrees relative to each other.

The motor 104 is disposed in and supported in the motor housing portion 114, proximal to a rear end of the tool housing 102, and operably coupled to the trigger 108 via motor control electronics 120, a controller 122, and/or switching mechanism 124. The motor 104 may be a frameless brushless DC (BLDC) or a brushed-type motor, or any other suitable motor (e.g., pneumatically or hydraulically operated or AC operated motor). The motor 104 may include a motor shaft (as is known) that is operably coupled to the output nose mechanism 106. Thus, actuation of the trigger 108 by a user (such as depression of the trigger 108) causes the motor 104 to operate and operate the output nose mechanism 106.

The output nose mechanism 106 includes a nose housing 126 and an impact mechanism 128 including a gear carrier 130, a ring gear 132, a hammer 134, and an anvil 136. The nose housing 126 is adapted to be supported by and coupled to the tool housing 102 via fasteners or other means, such as, for example, adhesive or welding. In general, the nose housing 126 includes opposing first and second nose housing ends 138, 140. The gear carrier 130 is operably coupled to the ring gear 132, hammer 134, and anvil 136, and the ring gear 132 is coupled to the nose housing 126 at the first nose housing end 138, with the gear carrier 130, hammer 134, and anvil 136 disposed in the nose housing 126, and an output drive lug 142 of the anvil 136 extending out of the second nose housing end 140. The second nose housing end 140 may also be adapted to receive a nose bushing 144 that receives and supports an output shaft 146 of the output drive lug 142 of the anvil 136 extending outwardly from the second nose housing end 140.

The output drive lug 142 may have a substantially square shaped and adapted to engage an output tool, for example, a socket, in a well-known manner. The socket is then adapted to engage a work piece, such as, for example, a fastener.

The gear carrier 130 is operably coupled to the motor shaft and is adapted to receive rotational force from the motor 104 and transfer the rotational force to the hammer 134 and anvil 136. For example, the gear carrier 130 includes a main body portion 148 and opposing first and second gear carrier end portions 150, 152, wherein the first gear carrier end portion 150 is operably coupled to the motor shaft, and the second gear carrier end portion 152 is received in the anvil 136. The gear carrier 130 also includes planet gears 154 operably coupled to the gear carrier 130, and gear carrier ball grooves 156 formed in the main body portion 148 that respectively receive balls 158. When the gear carrier 130 is installed on the motor shaft, the motor shaft extends into the first gear carrier end portion 150 and is disposed between the planet gears 154. Planet gear teeth of the planet gears 154 meshingly engage the motor shaft. This allows the motor shaft to rotate the gear carrier 130, as described below. The gear carrier ball grooves 156 are disposed between the first and second gear carrier end portions 150, 152, proximal to the second gear carrier end portion 152, and are adapted to respectively receive balls 158. The gear carrier ball grooves 156 and balls 158 are adapted to move the hammer 134 axially against a bias force of bias member 160 and away from the anvil 136 when a certain minimum amount of torque is reached, as discussed below.

The ring gear 132 includes ring gear teeth disposed on an inner surface of the ring gear 132, and that are adapted to meshingly engage planet gear teeth of the planet gears 154. Thus, when motor 104 is operated to cause rotation of the motor shaft, the ring gear 132 remains stationary and the motor shaft causes the planet gears 154 to rotate around the ring gear 132 via engagement with the ring gear teeth, thereby causing the gear carrier 130 to rotate.

The hammer 134 includes first and second hammer ends 162, 164, and an aperture extending through the hammer 134. The first hammer end 162 is adapted to be disposed over the gear carrier 130, with the gear carrier 130 extending through the aperture, and the second gear carrier end portion 152 extending outwardly from the second hammer end 164. The hammer 134 includes hammer ball grooves 168 on an inner surface that respectively receive balls 158. The hammer 134 also includes one or more hammer lugs 170 proximal to the second hammer end 164 that are adapted to impact the anvil 136, as described below.

The biasing member 160 is also disposed on the gear carrier 130 and extends into the aperture of the hammer 134 from the first hammer end 162. The biasing member 160 provides a biasing force between the hammer 134 and the gear carrier 130 in a direction axially away from the gear carrier 130. The biasing member 160 can be, for example, a spring and is adapted to apply the bias force to axially bias the hammer 134 away from the gear carrier 130 and towards the anvil 136.

The anvil 136 is adapted to be disposed on and receive at least a portion of the second gear carrier end portion 152 in an anvil aperture 172 of the anvil 136. The anvil 136 includes one or more impact sections 174 (also known as anvil wings) extending radially outwardly, and includes or is coupled to the output drive lug 142 that is adapted to receive and directly or indirectly couple to a variety of output tool bits or sockets (including, driver bits, drill bits, cutting bits, sockets, grinding bits, etc.), in a well-known manner. The impact sections 174 are adapted to receive impact force from the hammer lugs 170 to drive the output drive lug 142.

The nose bushing 144 is assembled in the nose housing 126 through the first nose housing end 138 and is disposed in the second nose housing end 140. The nose bushing 144 includes an aperture, and the output drive lug 142 extends through the aperture and outwardly from the second nose housing end 140.

Figure 3:
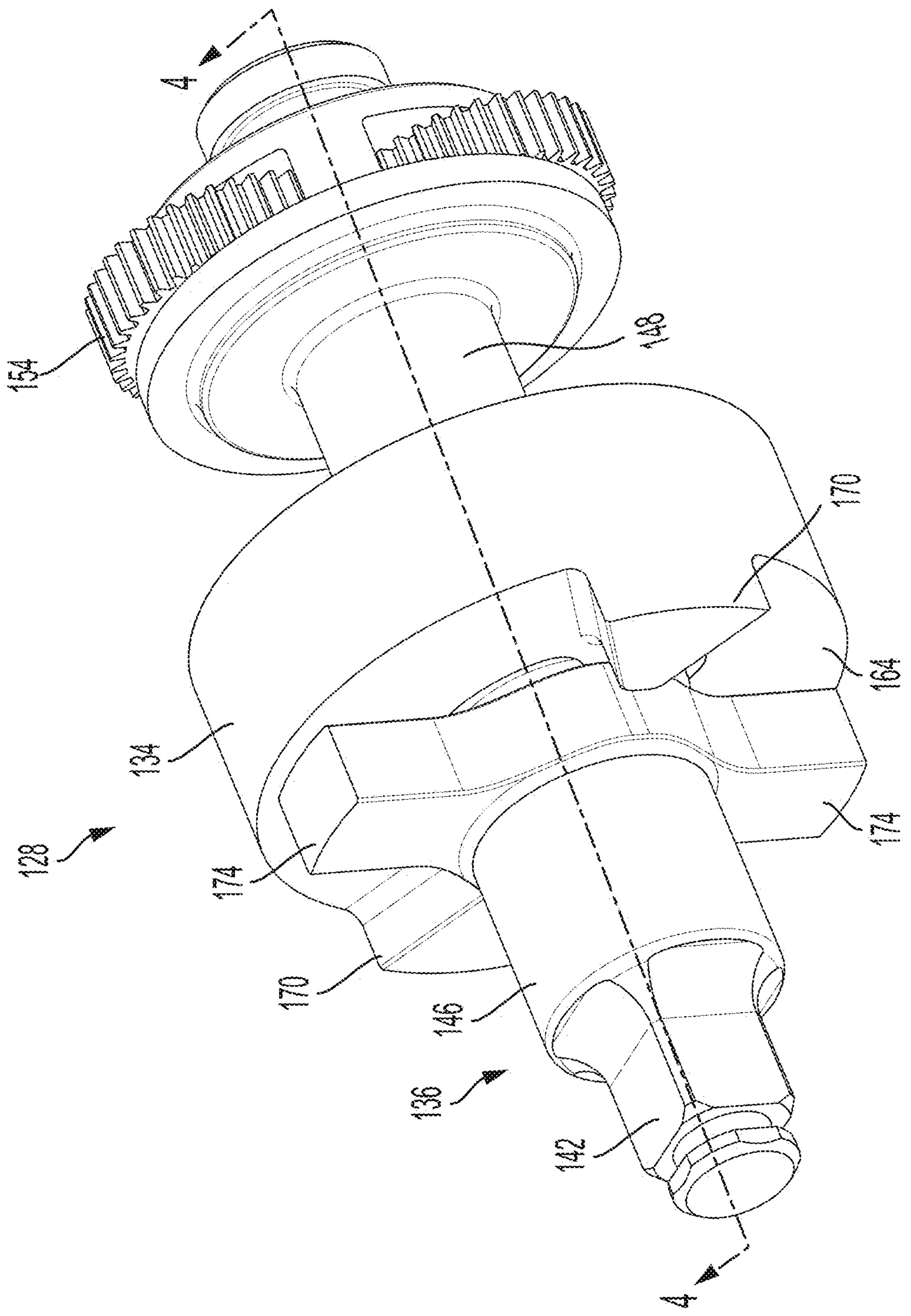
FIG. 3 is a perspective side view of an impact mechanism of an exemplar impact tool, according to an embodiment of the present invention.
Figure 4:
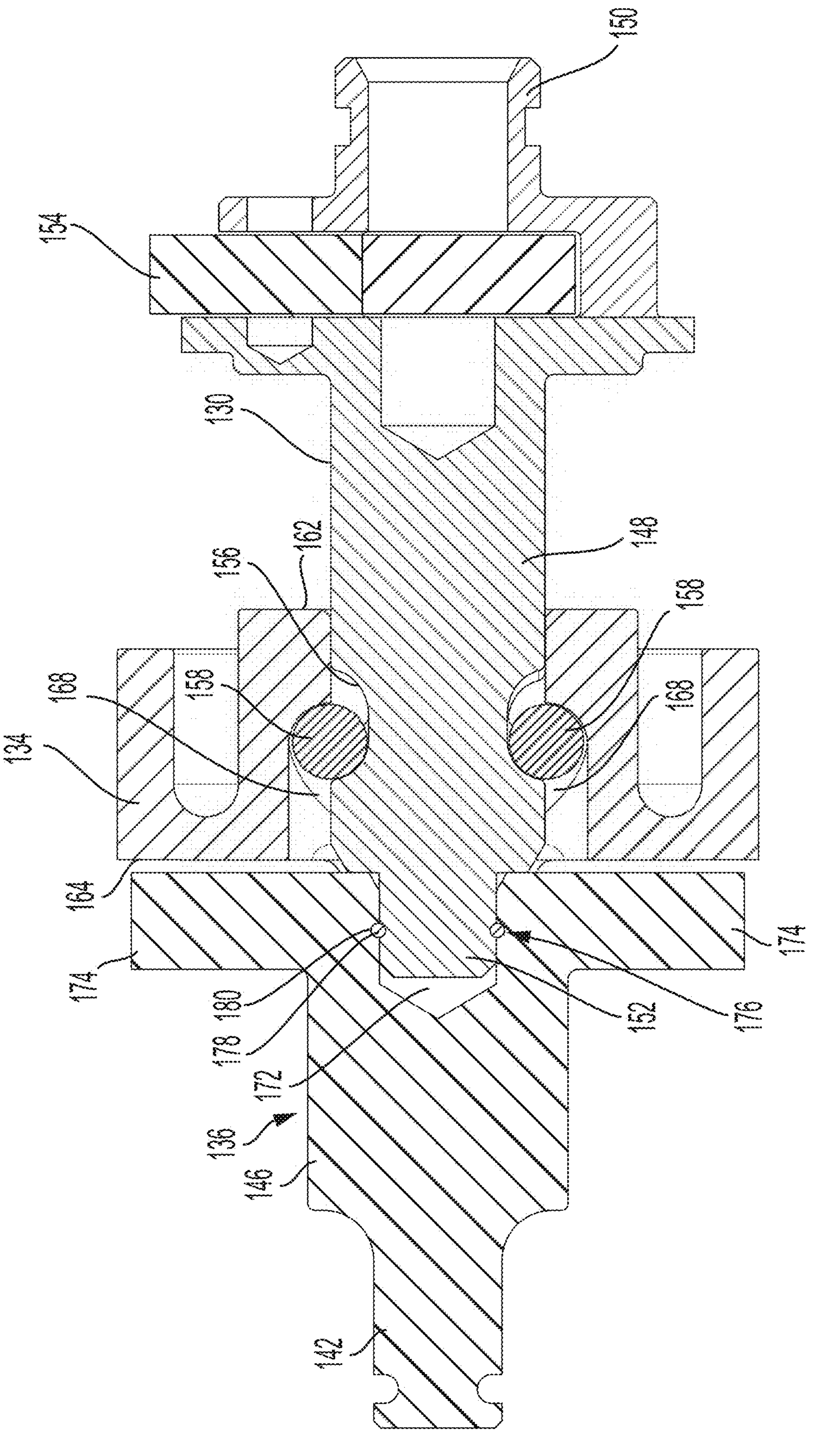
FIG. 4 is a sectional view of the impact mechanism of FIG. 3, taken along line A-A of FIG. 3.

Referring to FIGS. 3 and 4, parts of an embodiment of an impact mechanism 128 are shown. As shown in FIG. 4, the impact mechanism 128 includes an anvil brake mechanism 176. In this embodiment, the anvil brake mechanism 176 includes an O-ring 178 that is disposed within the anvil aperture 172 and surrounds the second gear carrier end portion 152. The O-ring 178 is sized and shaped to frictionally engage an inner surface of the anvil 136 formed by the anvil aperture 172 and an outer surface of the second gear carrier end portion 152 that is disposed in the anvil aperture 172. For example, the O-ring 178 may have an outer diameter that is greater than a diameter of the anvil aperture 172, such that the O-ring 178 is compressed when the second gear carrier end portion 152 is disposed into the anvil aperture 172.

By frictionally engaging the anvil 136 and the gear carrier 130, the O-ring 178 may place a frictional load on the anvil 136. By frictionally loading the anvil 136, the anvil 136 may be restricted from rebounding in a rotational direction opposite the desired driving rotational direction of the anvil 136 after the hammer 134 impacts the anvil 136. By restricting the anvil 136 from rebounding, the anvil 136 may be positioned in a way to transfer greater force between the hammer 134 and the anvil 136 by allowing for the hammer 134 to rotate a further distance before subsequently striking the anvil 136.

The O-ring 178 may be constructed of a high friction material, including, but not limited to, rubber, silicone, nitrile, or any other suitable material. As illustrated, the O-ring 178 has a substantially circular cross-sectional shape. However, it will be understood that in further embodiments, the O-ring 178 may have any other suitable shape, including, but not limited to, an oval, a rectangle, or any other suitable shape.

A receiving groove 180 may also be formed in the anvil aperture 172 to accommodate and seat the O-ring 178. In this regard, when the second gear carrier end portion 152 is disposed in the anvil aperture 172, the O-ring 178 may be seated and compressed within the receiving groove 180. The O-ring 178 may further seal a lubricating material, such as an oil or grease used to lubricate the rotation of the hammer 134 around the gear carrier 130, from escaping out of the impact tool 100.

During use of the impact tool 100 (i.e., when the trigger 108 is actuated by a user), the motor 104 rotates the motor shaft, which rotates the gear carrier 130, and the hammer 134 (via engagement of the gear carrier ball grooves 156 and hammer ball grooves 168 with respective balls 158) in selectively either one of clockwise or counter-clockwise rotational directions, which causes the hammer lugs 170 to contact the impact sections 174 to rotate the anvil 136 and the output drive lug 142 in the desired clockwise or counter-clockwise rotational direction. Once an amount of torque required to rotate or drive the output drive lug 142 exceeds a minimum torque amount, the gear carrier 130 rotates at a faster rotational velocity than the hammer 134 and the anvil 136, thereby causing the balls 158 to traverse along the gear carrier ball grooves 156. As the balls 158 traverse the gear carrier ball grooves 156, the hammer 134 overcomes the bias force applied by the biasing member 160 and moves in an axial direction towards the motor 104 and away from the anvil 136 until the hammer lugs 170 no longer contact the impact sections 174. Once the hammer lugs 170 no longer contact the impact sections 174, the bias member 160 causes the hammer 134 to move axially towards the anvil 136 and deliver a sudden rotational impact force to the anvil 136 and, consequently, the output drive lug 142. The O-ring 178 restricts the anvil 136 from rebounding or otherwise moving in a rotational direction opposite the rotational impact force after the hammer 134 delivers the rotational impact force to the anvil 136.

Figure 5:
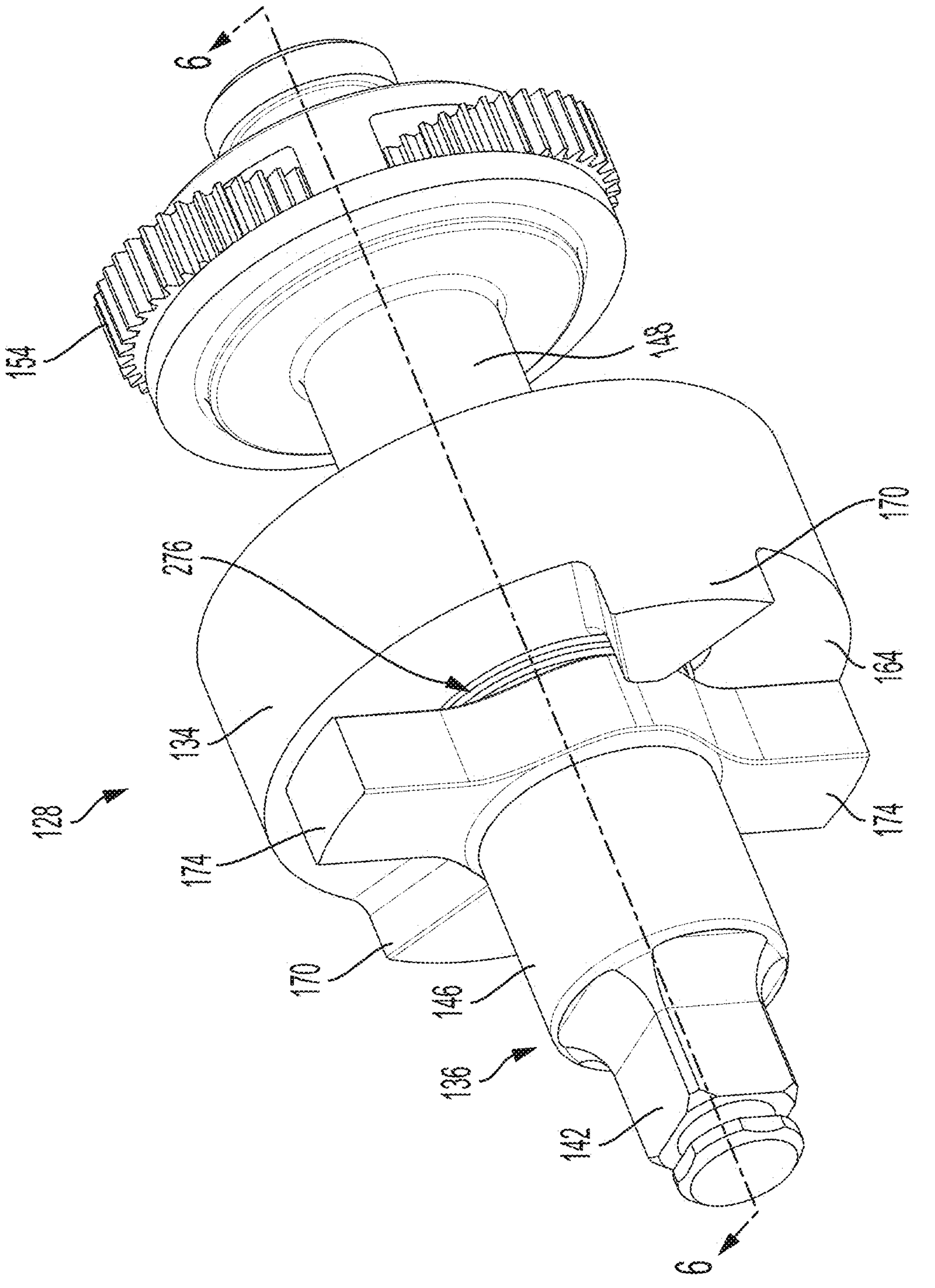
FIG. 5 is a perspective side view of an impact mechanism of an exemplar impact tool, according to another embodiment of the present invention.
Figure 6:
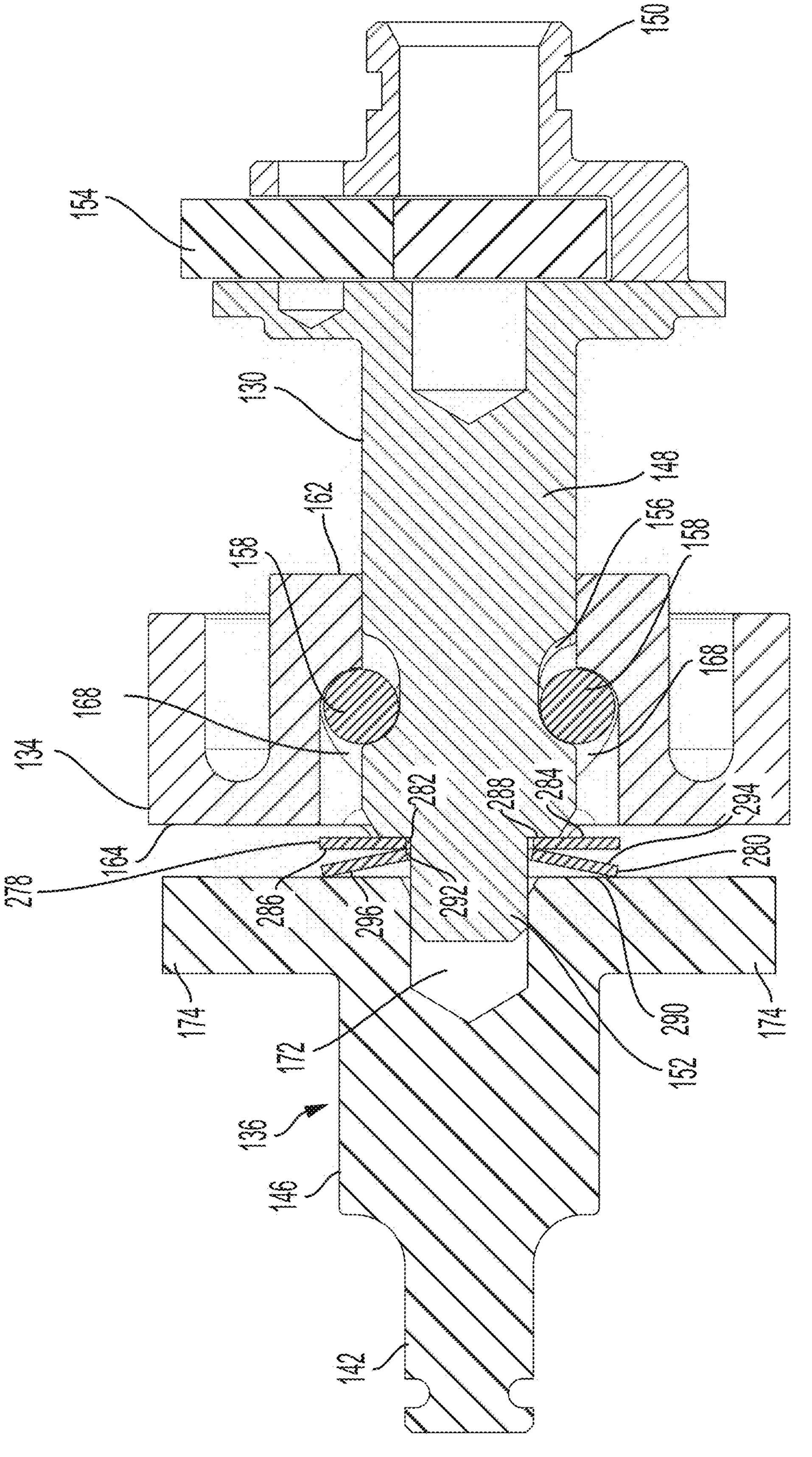
FIG. 6 is a sectional view of the impact mechanism of FIG. 5, taken along line B-B of FIG. 5.

In another embodiment, referencing FIGS. 5 and 6, the impact mechanism 128 may include an anvil brake mechanism 276. In this embodiment, the anvil brake mechanism 276 includes a thrust washer 278 and a biasing washer 280 (also referred to as a spring washer). The thrust washer 278 includes a through hole 282 and opposing first and second surfaces 284, 286. The thrust washer 278 may be disposed around the second gear carrier end portion 152 of the gear carrier 130 via the through hole 282, with the first surface 284 proximal to or abutting a surface 288 of the main body portion 148 of the gear carrier 130. The thrust washer 278 may also be disposed between the main body portion 148 of the gear carrier 130 and an end surface 290 of the anvil 136.

The biasing washer 280 includes a through hole 292 and opposing first and second surfaces 294, 296. The biasing washer 280 may be disposed around the second gear carrier end portion 152 of the gear carrier 130 via the through hole 292, with the first surface 294 proximal to or abutting the second surface 286 of the thrust washer 278 and the second surface 296 proximal to or abutting the end surface 290 of the anvil 136. The biasing washer 280 may also be disposed between the thrust washer 278 and the end surface 290 of the anvil 136.

The biasing washer 280 is adapted to be compressed between the anvil 136 and the main body portion 148 of the gear carrier 130 to provide a variable load between the anvil 136 and gear carrier 130, which allows for a preload to be applied to the anvil 136 to restrict the anvil 136 from rotating backwards or oscillating after the hammer 134 impacts the anvil 136. For example, during operation, the biasing washer 280 restricts the anvil 136 from rebounding or otherwise moving in a rotational direction opposite the rotational impact force, after the hammer 134 delivers a sudden rotational impact force to the anvil 136.

As illustrated, the biasing washer 280 may be a Belleville washer. However, it will be understood that any other suitable biasing device may be used, such as a coil spring, a leaf spring, or any other suitable biasing device.

Figure 7:
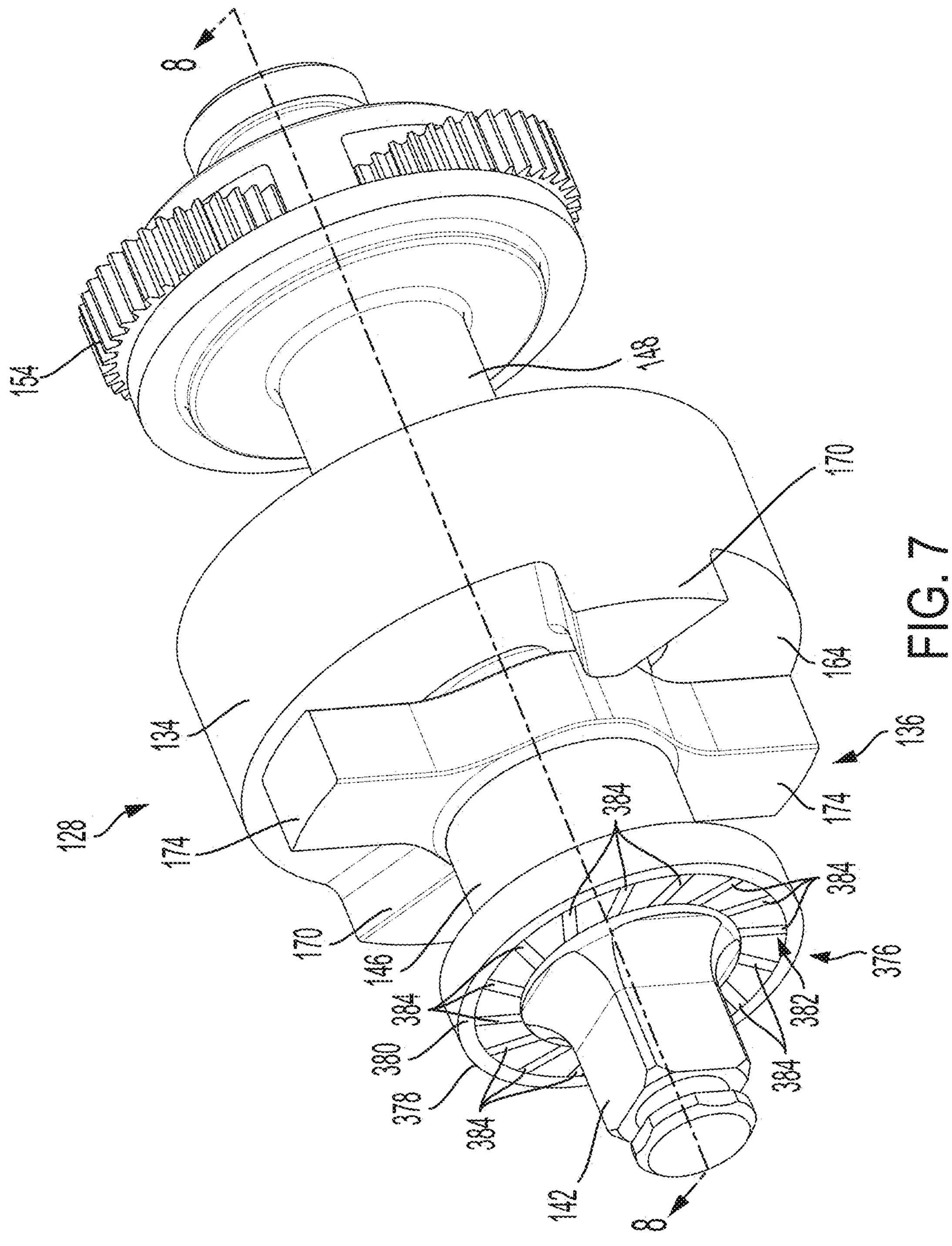
FIG. 7 is a perspective side view of an impact mechanism of an exemplar impact tool, according to another embodiment of the present invention.
Figure 8:
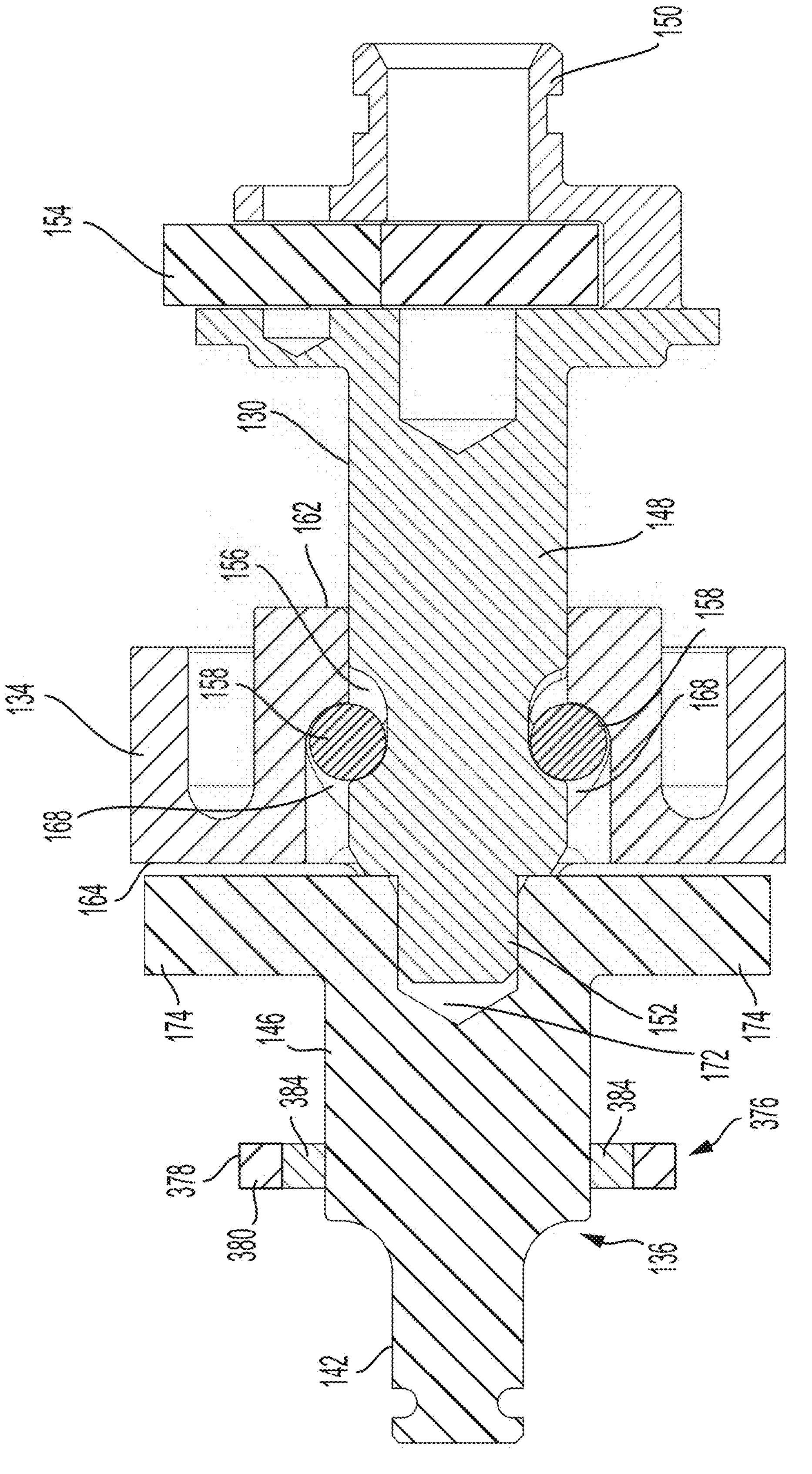
FIG. 8 is a sectional view of the impact mechanism of FIG. 7, taken along line C-C of FIG. 7.

In another embodiment, referencing FIGS. 7 and 8, the impact mechanism 128 may include an anvil brake mechanism 376. In this embodiment, the anvil brake mechanism 376 includes a clutch 378. The clutch 378 may be a one-way bearing, sprag clutch, or other similar mechanism that engages the anvil 136 to restrict the anvil 136 from rebounding or otherwise moving in a rotational direction opposite the rotational impact force, when the hammer 134 delivers a rotational impact force to the anvil 136.

In an example, the clutch 378 may be disposed on or around the output shaft 146 of the anvil 136, between the output drive lug 142 and the impact sections 174. The clutch 378 may include an outer race 380 and one or more engagement features 382. The outer race 380 may be fixedly coupled to a static component of the impact tool 100, such as nose bushing 144, nose housing 126, housing 102, or any other suitable static component. The one or more engagement features 382 are adapted to engage an outer surface of the output shaft 146 of the anvil 136 when the anvil 136 receives a rotational impact force from the hammer 134.

As illustrated, the engagement features 382 are sprags 384 having opposing first and second ends. Each of the sprags 384 may be rotatably coupled to the outer race 380 at the first end of the sprag and may be disposed at an angle with respect to the outer surface of the output shaft 146 of the anvil 136 and the outer race 380. The angle of each of the sprags 384 allow the anvil 136 to rotate in first and second rotational directions, but apply a braking force to the outer surface of the output shaft 146 of the anvil 136 when the anvil 136 receives a rotational impact force from the hammer 134. This braking force restricts the anvil 136 from rebounding or otherwise moving in a rotational direction opposite the rotational impact force, when the hammer 134 delivers a rotational impact force to the anvil 136.

In other embodiments, other suitable engagement features 382 may be used, such as substituting sprags 384 with a friction device, such as a clutch plate or a brake shoe coupled to the outer race 380. In such embodiments, the clutch 378 may include an engaging device, such as a spring or hydraulic system to apply a force on the engagement feature 382 relative to the anvil 136.

In some embodiments, the clutch may apply a fixed load onto anvil 136 and/or the clutch may include an adjustment mechanism to adjust the amount of load applied to the anvil 136. As a non-limiting example, the adjustment mechanism may be a screw, a lever, a slider, or any other suitable type of adjustment mechanism. By adjusting the load, a user may control the load applied to the anvil 136.

Referring back to FIGS. 1 and 2, the exemplar impact tool 100 may also include additional components. For example, and without limitation, the impact tool 100 may include electronic components, such as the motor control electronics 120, controller 122, and switching mechanism 124 that are operably coupled to and adapted to control the motor 104. For example, the motor control electronics 120 may include a printed circuit board (PCB) including one or more switching elements disposed thereon. The switching elements may be field effect transistors (FETs), such as, for example, metal-oxide semiconductor field-effect transistors (MOSFETs). In an embodiment, the switching elements may include three high-side switching elements, H1, H2, and H3, and three low-side switching elements, L1, L2, and L3, each being operable in either one of a first or conducting state and a second or non-conducting state. The switching elements are controlled by the PCB to selectively apply power from a power source (e.g., a battery pack) to the motor 104 to achieve desired commutation. By selectively activating particular high-side and low-side switching elements, the motor 104 is operated by having the motor control electronics 120 or controller 122 send a current signal through coils located on a stationary part of the motor 104 called a stator. The coils cause a magnetic force to be applied to a rotating part of the motor 104, called a rotor, when current runs through the coils. The rotor contains permanent magnets that interact with the magnetic forces caused by the windings of the stator. By selectively activating successive combinations of high and low-side switching elements in a particular order, thereby sending a particular order of current signals through the windings of the stator, the stator creates a rotating magnetic field which interacts with the rotor causing it to rotate, which rotates the motor shaft, in a well-known manner.

The controller 122 may be disposed in the handle housing portion 116 and operably coupled to the motor control electronics 120 via wiring. The controller 122 is also operably coupled to the switch mechanism 124 via wiring, and power receiving terminals 182 in the power source receiving end 118 via wiring. The controller 122 may also be part of an electronics module 184 having an electronic housing 186. For example, the electronics module 184 can include electrical components, for example, the controller 122, which may include a printed circuit board (PCB) that operably couples a battery (power source) to the trigger 108 and switch mechanism 124. The controller 122 can be enclosed within the electronics housing 186 that can be made of a reinforcing material, such as metal or a high-density polymer, and can further be shaped to substantially contour to the internal geometry of the handle housing portion 116.

The switch mechanism 124 may be disposed in the motor housing portion 114 or handle housing portion 116, and is operably coupled to the power source (such as a battery) and the motor 104 via the controller 122 and motor control electronics 120. In an embodiment, the trigger 108 is disposed substantially at an intersection of the handle and motor housing portions 114 and 116, and is operably coupled to the switch mechanism 124. Actuation of the trigger 108 (such as depression of the trigger 108) causes the motor 104 to operate and rotate the motor shaft in either one of clockwise or counterclockwise rotational directions, in a well-known manner. In an embodiment, the trigger 108 may also be biased such that the trigger 108 is depressible inwardly, relative to the impact tool 100, to cause the impact tool 100 to operate, and a release of the trigger 108 causes the trigger 108 to move outwardly, relative to the impact tool 100, to cease operation of the impact tool 100 via the biased nature of the trigger 108.

The trigger 108 and switch mechanism 124 may also be a variable speed type mechanism. In this regard, actuation or depression of the trigger 108 can cause the motor 104 to rotate the motor shaft at a faster speed the further the trigger 108 is depressed. A direction selector 188 may also be disposed near an intersection of the motor and handle housing portions 114, 116. The direction selector 188 is adapted to be moved between first and second positions (for example, by a user) to allow the user to select the desired rotational direction of the motor 104. For example, movement of the direction selector 188 to the first position can cause selection of the clockwise rotational direction, and movement of the direction selector 188 to the second position can cause selection of the counterclockwise rotational direction.

While the impact tool 100 is described above as having an output drive lug 142, the impact tool 100 may have different types of output mechanisms. For example, the impact tool 100 may include an impact type mechanism with a drill chuck or a drive lug, etc. The drive lug or drill chuck or can be coupled to other devices, such as a socket or other adapter, to apply torque to a work piece, such as, for example, a screw or bolt, in a well-known manner.

While the impact tool 100 is described as powered by a battery, the impact tool 100 may be power by other electrical power sources, such as an external wall outlet, etc. As discussed herein, the impact tool 100 is a pistol grip type power tool, such as an impact wrench. However, the impact tool 100 can be any powered or hand-held impact tool, including, without limitation, a hammer drill, impact drill, impact ratchet wrench, or other powered impact tool.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An impact mechanism for an impact tool, the impact mechanism comprising:
- a hammer including a hammer lug;
- an anvil including an anvil aperture, an inner surface formed by the anvil aperture, and an impact section adapted to receive a rotational impact force from the hammer lug;
- a gear carrier including opposing first and second end portions, wherein the first end portion is adapted to be rotatably driven by a motor and the second end portion is adapted to be disposed in the anvil aperture; and
- an O-ring adapted to be disposed in the anvil aperture and around the second end portion, wherein the O-ring is adapted to frictionally engage the inner surface to restrict the anvil from rotating backwards when the impact section receives the rotational impact force from the hammer lug.

2. The impact mechanism of claim 1, wherein the O-ring is constructed of rubber.

3. The impact mechanism of claim 1, wherein the O-ring is adapted to seal a lubricating material within the impact tool.

4. The impact mechanism of claim 1, further comprising a receiving groove formed in the inner surface, wherein the O-ring is adapted to be disposed in the receiving groove.

5. An impact mechanism for an impact tool, the impact mechanism comprising:

a hammer including a hammer lug;

an anvil including an anvil end surface, an anvil aperture extending into the anvil end surface, and an impact section adapted to receive a rotational impact force from the hammer lug;

a gear carrier including a body portion and opposing first and second end portions, wherein the first end portion is adapted to be rotatably driven by a motor and the second end portion is adapted to be disposed in the anvil aperture;

a thrust washer adapted to be disposed around the second end portion between the anvil end surface and the body portion; and a biasing washer adapted to be disposed around the second end portion between the thrust washer and the anvil end surface, wherein the biasing washer is adapted to engage the anvil end surface to restrict the anvil from rotating backwards when the impact section receives the rotational impact force from the hammer lug.

6. The impact mechanism of claim 5, wherein the biasing washer is a Belleville washer.

7. The impact mechanism of claim 5, wherein the biasing washer is a coil spring.

8. The impact mechanism of claim 5, wherein the biasing washer is adapted to apply a variable bias force to the anvil end surface.

9. An impact mechanism for an impact tool, the impact mechanism comprising:

a hammer including a hammer lug;

an anvil including an output shaft and an impact section adapted to receive a rotational impact force from the hammer lug;

a gear carrier adapted to be rotatably driven by a motor and operably coupled to the anvil; and a clutch disposed on the output shaft of the anvil and adapted to engage the anvil to restrict the anvil from rotating backwards when the impact section receives the rotational impact force from the hammer lug.

10. The impact mechanism of claim 9, wherein the clutch includes an outer race, and an engagement feature coupled to the outer race and adapted to engage the anvil.

11. The impact mechanism of claim 10, wherein the engagement feature includes sprags.

12. The impact mechanism of claim 10, wherein the engagement feature includes a clutch plate.

13. The impact mechanism of claim 10, wherein the engagement feature includes a brake shoe.

14. The impact mechanism of claim 9, wherein the clutch is adapted to provide a fixed load to the anvil.

15. The impact mechanism of claim 9, wherein the engaging device is adapted to provide a variable load to the anvil.

* * * * *